(12) United States Patent
Segev et al.

(10) Patent No.: US 11,853,218 B2
(45) Date of Patent: Dec. 26, 2023

(54) SEMI AND CACHED TLP COALESCING

(71) Applicant: Western Digital Technologies, Inc., San Jose, CA (US)

(72) Inventors: Amir Segev, Meiter (IL); Amir Rozen, Rishon Lezion (IL); Shay Benisty, Beer Sheva (IL)

(73) Assignee: Western Digital Technologies, Inc., San Jose, CA (US)

( * ) Notice: Subject to any disclaimer, the term of this patent is extended or adjusted under 35 U.S.C. 154(b) by 84 days.

(21) Appl. No.: 17/747,056

(22) Filed: May 18, 2022

(65) Prior Publication Data
US 2022/0276962 A1    Sep. 1, 2022

Related U.S. Application Data

(63) Continuation-in-part of application No. 17/184,531, filed on Feb. 24, 2021.
(Continued)

(51) Int. Cl.
*G06F 12/00*   (2006.01)
*G06F 12/0815*   (2016.01)
(Continued)

(52) U.S. Cl.
CPC ...... *G06F 12/0815* (2013.01); *G06F 12/0246* (2013.01); *G06F 12/0882* (2013.01)

(58) Field of Classification Search
CPC ............. G06F 12/0815; G06F 12/0246; G06F 12/0882; G06F 3/061; G06F 3/064;
(Continued)

(56) References Cited

U.S. PATENT DOCUMENTS

| 6,542,941 B1 | 4/2003 | Simpson, III |
| 7,424,566 B2 | 9/2008 | Manula et al. |

(Continued)

FOREIGN PATENT DOCUMENTS

| CN | 114253875 A | * | 3/2022 | ......... G06F 12/0238 |
| EP | 1222822 B1 | * | 9/2004 | ........... G11B 27/005 |

OTHER PUBLICATIONS

Kim et al. Optimized I/O Determininsm for Emerging NVM-based NVMe SSD in an Enterprise System, Proceedings of the 55th Annual Design Automation Conference, Jun. 24, 2018, 6 pages.
(Continued)

*Primary Examiner* — Mardochee Chery
(74) *Attorney, Agent, or Firm* — PATTERSON + SHERIDAN, LLP; Steven H. VerSteeg

(57) ABSTRACT

A data storage device includes a memory device and a controller coupled to the memory device. The controller is configured to receive a command, wherein the command comprises a plurality of logical block addresses (LBAs), determine that one or more LBAs of the plurality of LBAs are not aligned to a transfer layer packet (TLP) boundary, determine whether the one or more LBAs that are not aligned to a TLP boundary has a head that is unaligned that matches a previously stored tail that is unaligned, and merge and transfer the head that is unaligned with a previously stored tail that is unaligned when the head that is unaligned matches the previously stored tail that is unaligned.

20 Claims, 13 Drawing Sheets

Related U.S. Application Data

(60) Provisional application No. 63/116,459, filed on Nov. 20, 2020.

(51) Int. Cl.
  *G06F 12/02* (2006.01)
  *G06F 12/0882* (2016.01)

(58) Field of Classification Search
  CPC .............. G06F 3/0679; G06F 12/04; G06F 2212/1024; G06F 2212/7201; G06F 2212/7203
  USPC .......................................................... 711/3
  See application file for complete search history.

(56) References Cited

U.S. PATENT DOCUMENTS

| | | |
|---|---|---|
| 10,069,597 B2 | 9/2018 | Benisty et al. |
| 10,095,645 B2 | 10/2018 | Davis et al. |
| 10,628,369 B2 | 4/2020 | Minato et al. |
| 10,740,000 B2 | 8/2020 | Benisty |
| 10,789,019 B2 | 9/2020 | Kim et al. |
| 11,199,992 B2 | 12/2021 | Richter et al. |
| 2001/0011323 A1 | 8/2001 | Ohta et al. |
| 2003/0188054 A1 | 10/2003 | Yosimoto et al. |
| 2009/0037689 A1 | 2/2009 | Kanuri |
| 2009/0228630 A1 | 9/2009 | Wang et al. |
| 2014/0143471 A1 | 5/2014 | Moyer et al. |
| 2015/0254022 A1 | 9/2015 | Oikawa |
| 2016/0188473 A1 | 6/2016 | Kruckemyer et al. |
| 2017/0116117 A1 | 4/2017 | Rozen et al. |
| 2017/0285940 A1 | 10/2017 | Benisty et al. |
| 2018/0039448 A1 | 2/2018 | Harasawa et al. |
| 2018/0136869 A1 | 5/2018 | Mola |
| 2019/0235759 A1 | 8/2019 | Sen et al. |
| 2019/0278485 A1 | 9/2019 | Benisty |
| 2020/0112525 A1 | 4/2020 | Donley et al. |
| 2020/0192804 A1 | 6/2020 | Lee et al. |
| 2020/0204495 A1 | 6/2020 | Mallick et al. |

OTHER PUBLICATIONS

K Yogendhar, et al., Realizing the Performance Potential of a PCI-Express IP, ,Rambus Chip Technologies India (Pvt) Ltd., Design and Reuse, https://www.design-reuse.com/articles/15900/realizing-the-performance-potential-of-a-pci-express-ip.html, last visited Jan. 8, 2022, 9 pp.
Related U.S. Appl. No. 17/184,531, filed Feb. 24, 2021.

* cited by examiner

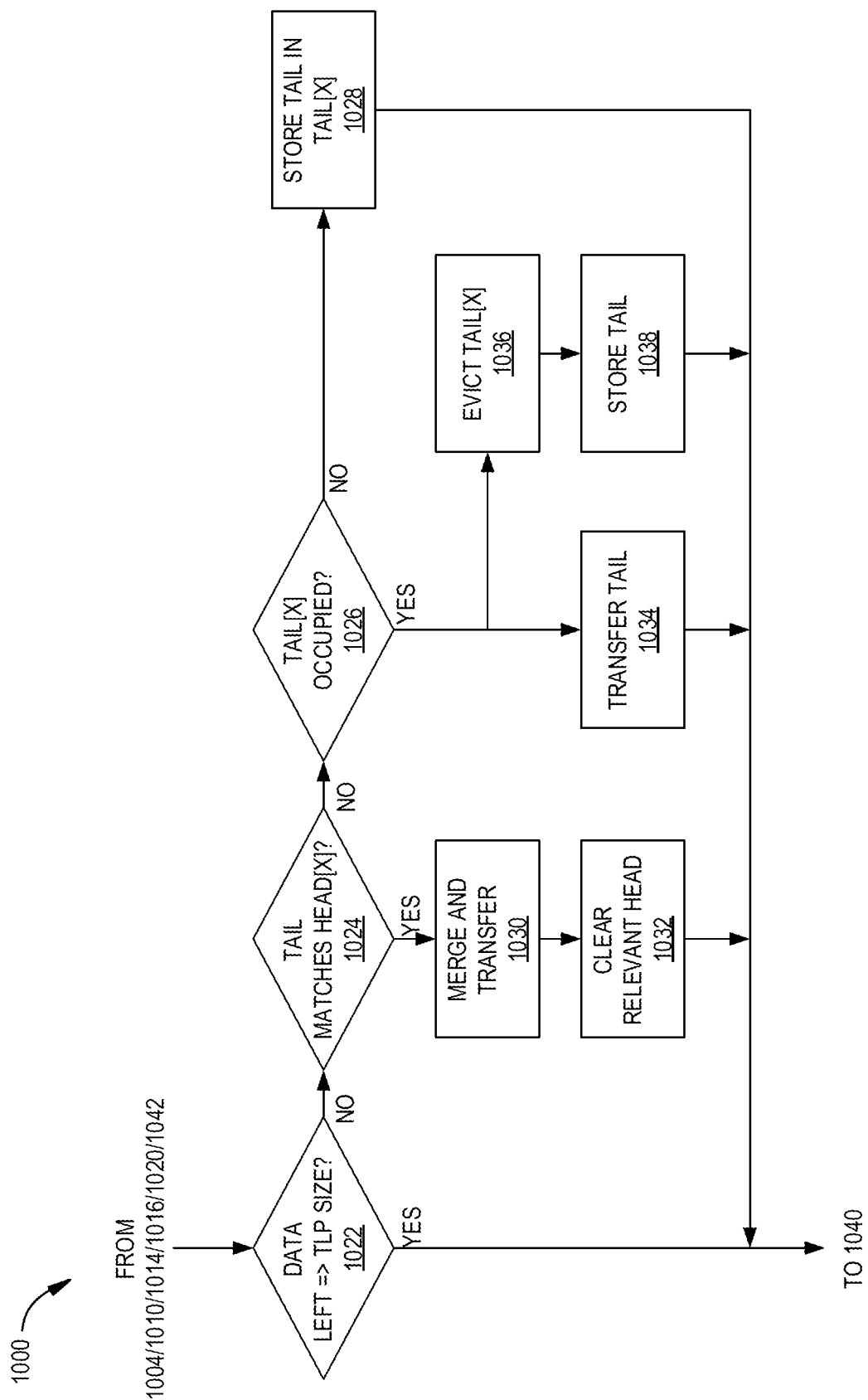

SEMI AND CACHED TLP COALESCING

CROSS-REFERENCE TO RELATED APPLICATIONS

This application is a continuation-in-part of co-pending U.S. patent application Ser. No. 17/184,531, filed Feb. 24, 2021, which claims benefit of U.S. provisional patent application Ser. No. 63/116,459, filed Nov. 20, 2020. Each of the aforementioned related patent applications is herein incorporated by reference.

BACKGROUND OF THE DISCLOSURE

Field of the Disclosure

Embodiments of the present disclosure generally relate to effective transport layer packet (TLP) utilization.

Description of the Related Art

Data storage devices, such as solid state drives, are frequently connected to host computers over the non-volatile memory express (NVMe) interface. In such systems, the host computer initiates data transfers by preparing a data buffer containing the data to be transferred to the storage device, or from the storage device. In NVMe, the physical memory locations of the data buffer are indicated by either physical region page (PRP) entries or scatter gather lists (SGL). Using either PRP or SGL, the host computer transfers pointers of the physical memory locations to the storage device, as host command pointers. The host computer sends at least as many pointers as physical memory locations are used in storing the data for transfer.

When working with NVMe over PCIe, the host computer may send pointers pointing to contiguous logical addresses. However, when transferring the data associated with the pointers, the data storage device may be inefficient in utilizing the physical (PCIe) bus. The inefficient utilization may result in performance degradation. For example, each packet of data (i.e., transport layer packet (TLP)), that is transferred over the PCIe bus may have about 24 bytes of overhead. When the payload size of data is about 256 bytes, the overhead occupies about 10% of the total payload size. Furthermore, when the data from contiguous logical addresses is larger than the maximum TLP, the data storage device may break the data into several smaller TLPs. Each of the smaller TLPs includes overhead, which may increase latency and require more bandwidth.

Therefore, there is a need in the art for an improved TLP utilization that optimizes latency and bandwidth.

SUMMARY OF THE DISCLOSURE

The present disclosure generally relates to effective transport layer packet (TLP) utilization. A data storage device includes a memory device and a controller coupled to the memory device. The controller is configured to receive a command, wherein the command comprises a plurality of logical block addresses (LBAs), determine that one or more LBAs of the plurality of LBAs are not aligned to a transfer layer packet (TLP) boundary, determine whether the one or more LBAs that are not aligned to a TLP boundary has a head that is unaligned that matches a previously stored tail that is unaligned, and merge and transfer the head that is unaligned with a previously stored tail that is unaligned when the head that is unaligned matches the previously stored tail that is unaligned.

In one embodiment, a data storage device includes a memory device and a controller coupled to the memory device. The controller is configured to receive a command, wherein the command comprises a plurality of logical block addresses (LBAs), determine that one or more LBAs of the plurality of LBAs are not aligned to a transfer layer packet (TLP) boundary, determine whether the one or more LBAs that are not aligned to a TLP boundary has a head that is unaligned that matches a previously stored tail that is unaligned, and merge and transfer the head that is unaligned with a previously stored tail that is unaligned when the head that is unaligned that matches the previously stored tail that is unaligned.

In another embodiment, a data storage device includes a memory device and a controller coupled to the memory device. The controller is configured to receive a plurality of logical block addresses (LBAs), determine that at least one LBA of a flash interface module (FIM) is unaligned to a transfer layer packet (TLP) size, store either a head or a tail of the at least one LBA in a merging buffer, wherein the head or the tail corresponds with an unaligned portion of the at least one LBA, either merge the head with another unaligned tail stored in the merging buffer, wherein the another unaligned tail corresponds to a different LBA, or merge the tail with another unaligned head stored in the merging buffer, wherein the another unaligned head corresponds to a different LBA, and program the merged LBA to a host device.

In another embodiment, a data storage device includes memory means and a controller coupled to the memory means. The controller is configured to receive one or more unaligned logical block address (LBAs), determine that a head of a received unaligned LBA is unaligned with a transfer layer packet (TLP) boundary or that a tail of the received unaligned LBA is unaligned with the TLP boundary, store the head or the tail in a merging buffer, determine if there is another tail in the merging buffer that matches the head or if there is another head in the merging buffer that matches the tail, merge the another tail and the head when the another tail matches the head or merge the another head and the tail when the another head matches tail, and program the merged another head or the merged another tail to a host device.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 10A-10C are flow diagrams illustrating a method of buffering a head or a tail of a FMU, according to certain embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to effective transport layer packet (TLP) utilization. A data storage device includes a memory device and a controller coupled to the memory device. The controller is configured to receive a command, wherein the command comprises a plurality of logical block addresses (LBAs), determine that one or more LBAs of the plurality of LBAs are not aligned to a transfer layer packet (TLP) boundary, determine whether the one or more LBAs that are not aligned to a TLP boundary has a head that is unaligned that matches a previously stored tail that is unaligned, and merge and transfer the head that is unaligned with a previously stored tail that is unaligned when the head that is unaligned matches the previously stored tail that is unaligned.

Figure 1:
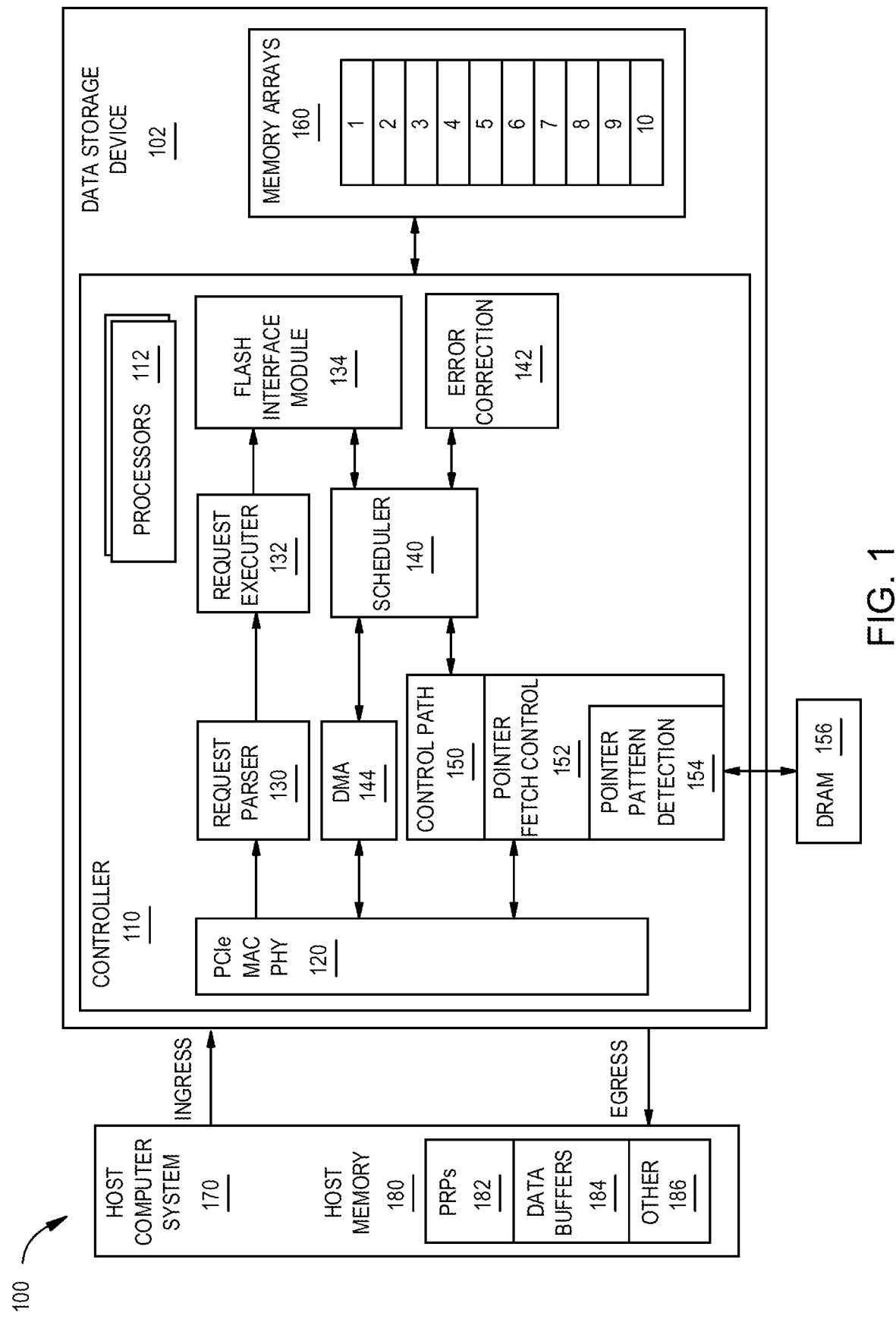
FIG. 1 is a schematic block diagram of an example computing system including a host computer system and a storage device, according to one embodiment.

FIG. 1 is a schematic block diagram of an example computing system 100 including a host computer system 170 and a data storage device 102, according to one embodiment. In some examples, the data storage device 102 may be a solid state drive for the host computer system 170. The host computer system 170 may utilize a non-volatile memory (NVM) included in data storage device 102 (shown as memory arrays 160) to write and to read data, such as for long term memory storage. The data storage device 102 may be an internal storage drive, such as a notebook hard drive or a desktop hard drive. The data storage device 102 may be a removable mass storage device, such as, but not limited to, a handheld, removable memory device, such as a memory card (e.g., a secure digital (SD) card, a micro secure digital (micro-SD) card, or a multimedia card (MMC)) or a universal serial bus (USB) device. The data storage device 102 may take the form of an embedded mass storage device, such as an eSD/eMMC embedded flash drive, embedded in host computer system 170. The data storage device 102 may also be any other type of internal storage device, removable storage device, embedded storage device, external storage device, or network storage device.

In some examples, the data storage device 102 may include additional components not shown in FIG. 1 for the sake of clarity. For example, the data storage device 102 may include a printed circuit board (PCB) to which components of the data storage device 102 are mechanically attached and which includes electrically conductive traces that electrically interconnect components of the data storage device 102, or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 102 may be directly coupled (e.g., directly soldered) to a motherboard of the host computer system 170.

The host computer system 170 may be a wide range of devices, such as computer servers, network attached storage (NAS) units, desktop computers, notebook (i.e., laptop) computers, tablet computers (i.e., "smart" pad), set-top boxes, telephone handsets (i.e., "smart" phones), televisions, cameras, display devices, digital media players, video gaming consoles, video streaming devices, and automotive applications (i.e., mapping, autonomous driving).

The host computer system 170 includes a host memory 180, such as DRAM or other main memories. An application program may be stored to host memory 180 for execution by components of host computer system 170. The host memory 180 may include host queue, such as command submission queues and command completion queues. The host memory 180 includes physical region page (PRP) pointers 182, data buffers 184, such as a host data buffer, and other types of memory structures 186.

The data storage device 102 includes MAC and PHY components 120 for ingress of communications from host computer system 170 to data storage device 102 and egress of communications from data storage device 102 to host computer system 170. A link between data storage device 102 and host computer system 170 may be any appropriate link, such as a Peripheral Component Interface Express (PCIe) link in this example. A PCIe link may be one to thirty-two lanes, depending on the number of available PHYs connecting two PCIe connectors. The PCIe link is typically set during end point device initialization, such as initialization of data storage device 102.

The link between host computer system 170 and data storage device 102 operates under a communication protocol, such as PCIe serial communication protocol or other suitable communication protocols. Other suitable communication protocols include ethernet, serial attached SCSI (SAS), serial AT attachment (SATA), any protocol related to remote direct memory access (RDMA) such as Infiniband, iWARP, or RDMA over Converged Ethernet (RoCE), and other suitable serial communication protocols. In other examples, data storage device 102 may also be connected to host computer system 170 through a switch or a bridge.

In the PCIe communication protocol, host computer system 170 and data storage device 102 may send requests to each other as transport layer packets (TLPs). TLPs may include an optional TLP prefix, a TLP header, a data payload, and an optional TLP digest. A TLP header includes a type field, which may indicate types of transactions.

As TLPs are transferred between host computer system 170 and data storage device 102, a data link layer and physical layer are added to each TLP to ensure the TLP arrives at the intended destination. Each TLP includes a certain overhead from the added data link layer and physical layer. For example, TLP may include an optional end-to-end cyclic redundancy checksum (ECRC) in TLP digest. A data link layer adds the sequence number and link layer CRC (LCRC) to the TLP to ensure successful transmission across the link. A physical layer adds information to mark the beginning and end of the TLP.

The memory arrays 160 of storage device 102 may be configured for long-term storage of information as non-volatile memory space and retains information after power on/off cycles. The memory arrays 160 may consist of one of more dies of NAND flash memory. Other examples of non-volatile memory include phase change memories, ReRAM memories, MRAM memories, magnetic media (including shingle magnetic recording), optical disks, floppy disks, electrically programmable read only memories (EPROM), electrically erasable programmable read only memories (EEPROM), and other solid-state memories. The magnetic media non-volatile memory may be one or more magnetic platters in storage device 102. Each platter may contain one or more regions of one or more tracks of data. The memory arrays 160 may additionally include one or more types of non-volatile memory.

The data storage device 102 includes a controller 110 which manages operations of data storage device 102, such as writes to and reads from memory arrays 160. The controller 110 may include one or more processors 112, which may be multi-core processors. The processors 112 handles the components of data storage device 102 through firmware code.

The controller 110 may operate under NVM Express (NVMe) protocol, but other protocols are applicable. NVMe protocol is a communications interface/protocol developed for SSDs to operate over a host computer system and data storage device linked over a PCIe interface. NVMe protocol provides a command submission queue and command completion queue for access of data stored in data storage device 102 by host computer system 170. The data storage device 102 may fetch or read host commands from a command submission queue of host queues of host memory 180.

The controller 110 executes computer-readable program code (e.g., software or firmware) executable instructions (herein referred to as "instructions"). The instructions may be executed by various components of controller 110, such as processors 112, logic gates, switches, application specific integrated circuits (ASICs), programmable logic controllers, embedded microcontrollers, and other components of controller 110.

The instructions are stored in a non-transitory computer readable storage medium. In certain embodiments, the instructions are stored in a non-transitory computer readable storage medium of data storage device 102, such as in a read-only memory or memory arrays 160. Instructions stored in data storage device 102 may be executed without added input or directions from host computer system 170. In other embodiments, the instructions are transmitted from host computer system 170. The controller 110 is configured with hardware and instructions to perform the various functions described herein and shown in the figures.

The data storage device 102 may also include other components, such as flash interface module 134, a direct memory access (DMA) module 144, a scheduler 140, an error correction module 142, a command executor 132, and a control path 150. The flash interface module 134 interacts with memory arrays 160 for read and write operations. The scheduler 140 controls the data transfer while activating control path 150 for fetching physical page regions (PRPs), posting completion and interrupts, and activating the DMA module 144 for the actual data transfer between host computing system 170 and data storage device 102. The error correction module 142 corrects the data fetched from memory arrays 160. The command parser 130 fetches commands to command executor 132 for execution on flash interface module 134. The DMA module 144 executes data transfers between host computer system 170 and data storage device 102.

In general, host computer system 170 initiates data transfers (to data storage device 102 or from data storage device 102) by transmitting a host command to data storage device 102. Over NVMe, the data related to a host command may be indicated by a PRP entry or an SGL. In either system, the data of a host command is transmitted as a series of host command pointers to physical memory of host memory 180. In this example, host computer system 170 prepares the data to be transferred in data buffers 184 of host memory 180, and generates a set of pointers to the data to be transferred as PRPs 182. The control path 150, via pointer fetch control 152, receives the host command pointers and stores the host command pointers until the host command can be executed.

In this example, pointer pattern detection 154 is a module of pointer fetch control 152 which can be used to analyze host command pointers received from host computer system 170 to detect patterns in the host command pointers. As described in further detail below, if a pattern can be detected in the host command pointers, pointer pattern detection 154 can store the received pointers in a reduced pointer storage structure. In some examples pointer pattern detection 154 may be implemented as a hardware component of device controller 110, although in other examples pointer pattern detection 154 may be implemented as firmware of device controller 110.

The pointer pattern detection 154 stores host command pointers received from host computer system 170 in DRAM 156. In this example, DRAM 156 is shown outside of storage device 102, however, in other examples host command pointers may instead be stored internal to storage device 102, such as in an SRAM of the data storage device 102.

Figure 2:
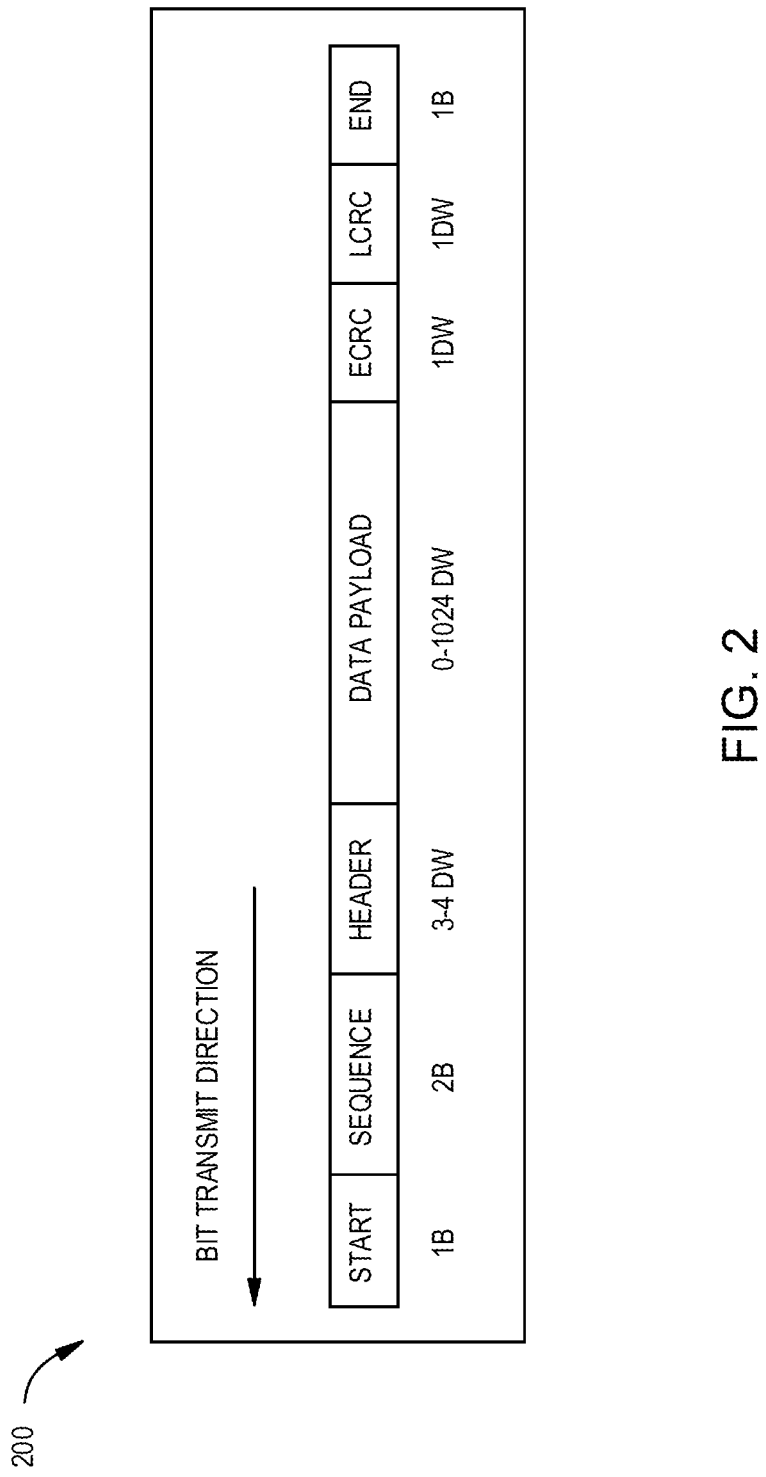
FIG. 2 is a schematic illustration of a TLP, according to one embodiment.

FIG. 2 is a schematic illustration of a TLP 200, according to one embodiment. As described in FIG. 1, the TLP 200 may include an optional TLP prefix, a TLP header, a data payload, and an optional TLP digest. The data payload is the information that is transferred between the host, such as the host computer system 170, and the data storage device, such as the data storage device 102 of FIG. 1. The data payload of the TLP 200 may have an average size of about 256 bytes or a maximum size of up to about 4 KB or about 4,096 bytes. A TLP header includes a type field, which may indicate types of transactions. The TLP header may have a size between about 3 double words and 4 double words, where a double word is equal to about 32 bits or 4 bytes. Furthermore, the TLP 200 may include a data link layer, physical layer, and additional overhead. For example, the TLP 200 may include an optional end-to-end cyclic redundancy checksum (ECRC), where the ECRC has a size of about 1 double word. The previously listed values are not intended to be limiting, but to provide an example of a possible embodiment.

A data link layer adds the sequence number and link layer CRC (LCRC) to the TLP 200 to ensure successful transmission across the link, where the link is the transmission of data between the host and the data storage device. The sequence number size may be about 2 bytes and the LCRC size may have a size of about 1 double word. A physical layer adds information to mark the beginning and end of the TLP 200, where the information marking the beginning (i.e., "Start") has a size of about 1 byte and the information marking the end (i.e., "End") has a size of about 1 byte. The previously listed values are not intended to be limiting, but to provide an example of a possible embodiment.

Figure 3:
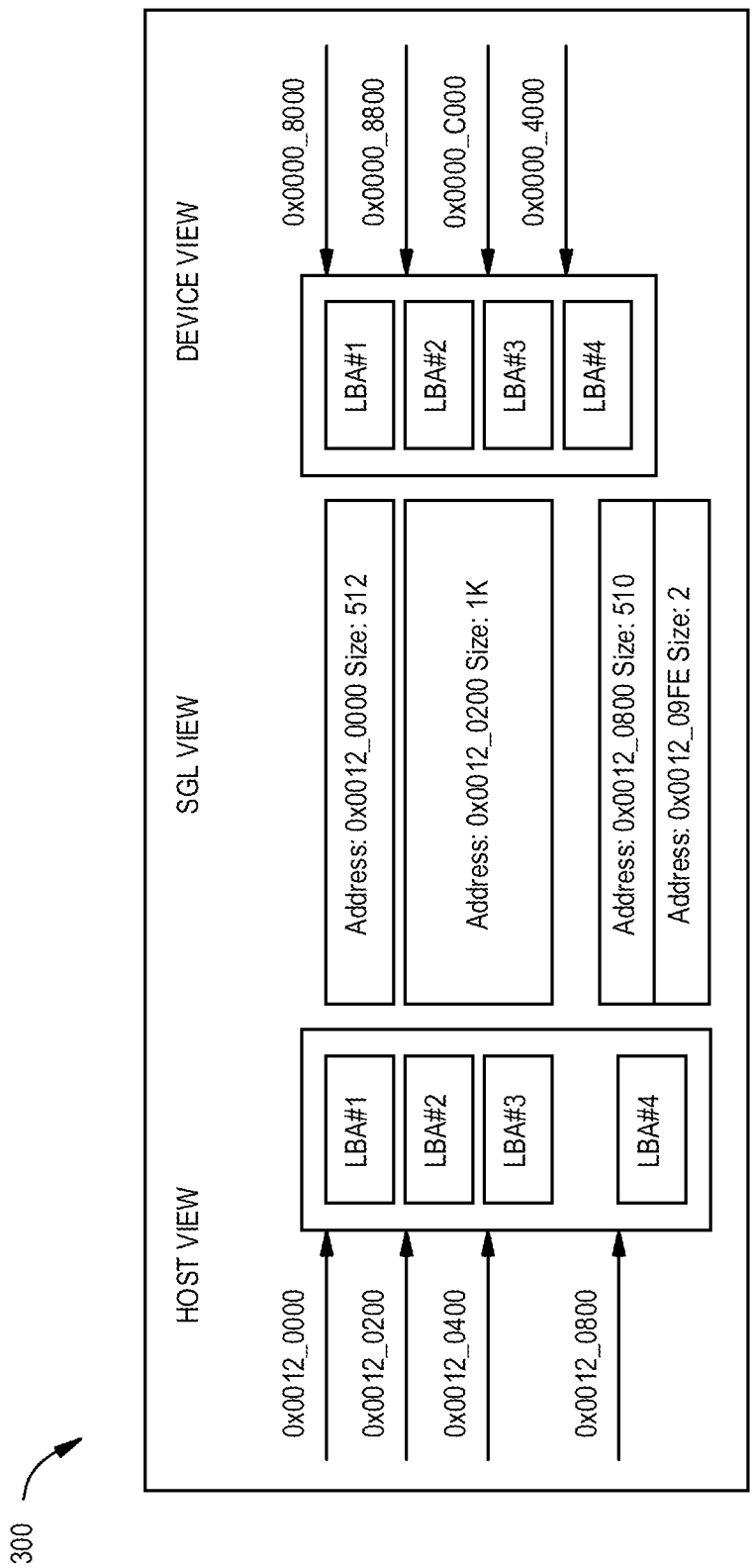
FIG. 3 is a schematic illustration of a command according to various views, according to one embodiment.

FIG. 3 is a schematic illustration of a command 300 according to various views, according to one embodiment. The command 300 has three different views, dependent on where the command 300 is being viewed from. The three different views include a host view, a scatter gather list (SGL) view, and a device view. The host view may be the view of the command 300 in the host computer system 170 of FIG. 1, such as where the device needs to read data from or write data to. The SGL view (including a physical region page (PRP) view) is a list provided to the device as to the host view. The device view may be the view of the command 300 in the data storage device 102 of FIG. 1, such as how the data is arranged in the NVM, such as the memory arrays 160 of FIG. 1.

The command 300 includes 4 logical block addresses (LBAs), LBA #1, LBA #2, LBA #3, and LBA #4. Each of the LBAs have a size of about 512 bytes. In the host view, the 4 LBAs are not continuous, as indicated by the space between LBA #3 and LBA #4. For example, in the host view, LBA #1 has an address of 0x0012_0000, LBA #2 has an address of 0x0012_0200, LBA #3 has an address of 0x0012_0400, and LBA #4 has an address of 0x0012_0800. If the 4 LBAs were continuous, then the address of the LBA #4 would be 0x0012_0600 rather than 0x0012_0800. The device view shows the location of the data (i.e., LBA #1-LBA #4) inside an internal SRAM as it was loaded from the NVM (e.g., memory arrays 160 of FIG. 1) based on available SRAM buffers. The internal SRAM may be located in the controller, which may be the controller 110 of FIG. 1, of the data storage device, which may be the data storage device 102 of FIG. 1. For example, LBA #1 has an address of 0x0000_8000, LBA #2 has an address of 0x0000_8800, LBA #3 has an address of 0x0000_C000, and LBA #4 has an address of 0x0000_4000.

The SGL view includes 4 entries, where the first entry is the LBA #1, the second entry is the LBA #2 and the LBA #3, the third entry and the fourth entry are the LBA #4. When transferring data between the host and the device, the data may be transferred in a maximum TLP size, where the maximum TLP size is about 256 bytes in this example. For example, when the first entry is transferred, the first entry is transferred in 2 TLPs. Likewise, when the second entry is transferred, the second entry is transferred in 4 TLPs.

However, when transferring the LBA #4, the transfer may occur in either 3 transfers or 2 transfers. In the first example, the transfer occurs in 3 transfers where a first transfer is 256 bytes, the second transfer is 254 bytes, and the third transfer is 2 bytes. The first transfer and the second transfer are the transfers associated with the third SGL entry. Rather than performing 3 transfers, where each transfer has a TLP header information and other overhead, 2 transfers would have sufficed if the $3^{rd}$ transfer was continuous and consecutive with the $2^{nd}$ transfer. More specifically, the $3^{rd}$ address is the next address after the $2^{nd}$ address and hence, the $3^{rd}$ address is consecutive and continuous with the $2^{nd}$ address. For example, the first transfer may be 256 bytes and the second transfer may be 256 bytes, where the second transfer includes 254 bytes from the third SGL entry and 2 bytes from the fourth SGL entry. By having a minimal amount of transfers, bandwidth may be more efficiently utilized.

Figure 4:
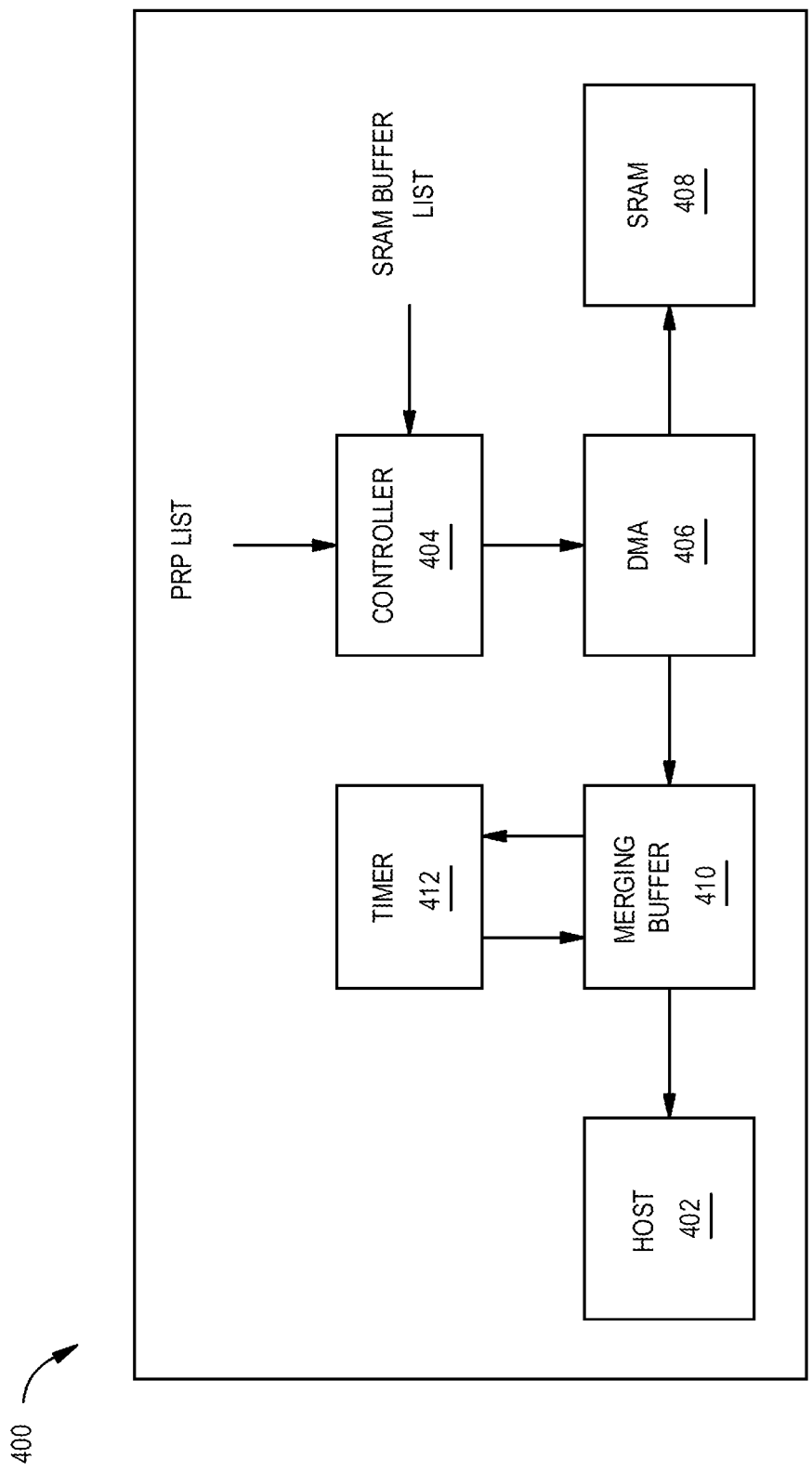
FIG. 4 is a schematic block diagram of the transfer of data to a host device, according to one embodiment.

FIG. 4 is a schematic block diagram of the transfer of data to a host device, according to one embodiment. A data storage device, such as the data storage device 102 of FIG. 1, includes a controller 404 that interacts with a DMA 406. The controller 404 may be the controller 110 of FIG. 1. A PRP list and a SRAM buffer list is utilized by the controller 404 to determine where the data is stored or will be stored in the SRAM 408 or any other memory device of the data storage device. It is to be understood that the SRAM buffer list is utilized as an example in the current figure and the buffer list may be any appropriate internal buffer list to track the location of data stored in the data storage device. Furthermore, when receiving a command, such as a read command, from a host device 402, the DMA 406 may generate one or more requests associated with the received command. For example, a received command may be associated with 4 generated requests.

The controller 404 activates the DMA 406 to read data associated with the one or more generated requests associated with the host command from the SRAM 408, or any other memory, and writes the relevant data back to the host 402. The DMA 406 passes the data associated with the one or more generated requests to a merging buffer 410, where the passed data is merged with any data that has a sequential logical address with the data located in the merging buffer 410.

For example, if the data in the merging buffer has a logical address of 0x000_8000, such as the LBA #1 of the device view described in FIG. 3, and a size of about 512 bytes, a sequential logical address would be 0x0000_8800. When a LBA with a sequential logical address is received at the merging buffer 410, the previous LBA and the received LBA are merged. However, when the received LBA is not sequential to the previous LBA, then the previous LBA is written to the host and the received LBA is programmed to the merging buffer 410.

The controller 404 utilizes a timer 412 to ensure that a generated request or a merged request does not remain in the merging buffer 410 longer than a time threshold. The timer 412 may be an individual timer for the last generated request received at the merging buffer and/or a timer for the merged request. When the timer 412 reaches the time threshold, the generated request or the merged request in the merging buffer 410 is written to the host 402. The time threshold may be a timeout counter, such as when the timer 412 reaches the time threshold, the generated request or the merged request has timed out. It is contemplated that the data storage device may include more than one merging buffer, such that each of the merging buffers has a timer associated with the generated request or the merged request stored in the relevant merging buffer.

Figure 5A:
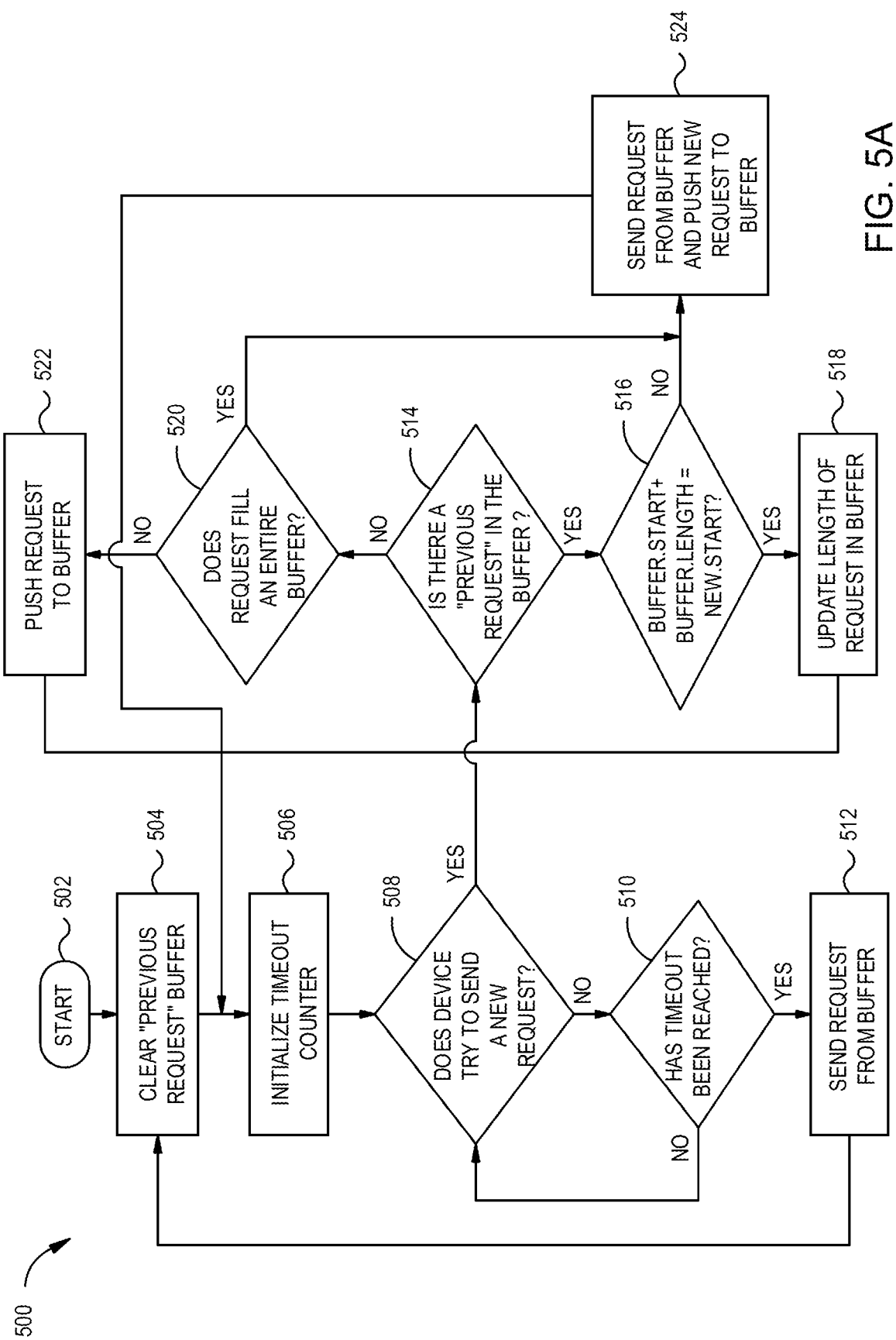
FIG. 5A is a method illustrating optimizing the storage of requests in a buffer, according to one embodiment.

FIG. 5A is a method 500 illustrating optimizing the storage of generated requests in a buffer, according to one embodiment. At block 502, the method 500 begins when the data storage device, such as the data storage device 102 of FIG. 1, attempts to send data associated with a new command to the host, such as the host computer system 170 of FIG. 1. It is to be understood that while the data storage device to host transaction is exemplified, the embodiments herein are applicable to the reciprocating transactions, such as the host to data storage device transactions. Furthermore, data may be retrieved or stored in any applicable location in the data storage device, such as a non-volatile memory or a volatile memory.

At block 504, the "previous request" buffer is cleared, such that the generated request or the merged request in the buffer, such as the merging buffer 410 of FIG. 4, are written to the respective location. The "previous request" buffer may be the generated request or the merged request stored in the merging buffer. The newly generated request associated with the new command is stored in the buffer after the "previous request" is cleared from the buffer.

At block 506, a timeout counter is initialized, where the timeout counter may be the timer 412 of FIG. 4. In some examples, the timeout counter is counting only when one or more requests or a merged request is located in the buffer. For example, when the buffer is empty, the timeout counter is not incrementing or initialized. At block 508, the controller determines if the data storage device has received an additional generated request from the host device, such as from the host computer system 170 of FIG. 1. If the controller determines that the additional generated request has not been sent at block 508, then the controller determines if a maximum threshold value of the timeout counter has been reached or exceeded at block 510. The maximum threshold value may be a configurable value based on the data traffic to and from the buffer.

If the controller determines that the timeout counter has not been reached at block 510, then the controller waits for the additional generated request to arrive at block 508. However, if the timeout has been reached at block 510, the controller sends the merged request of the one or more generated requests stored in the buffer to the host device at block 512. After sending the merged request of the one or more generated requests stored in the buffer at block 512, the buffer is cleared at block 504. In the description herein, the merged request may refer to either one or more requests or the merged request of the one or more generated requests, for exemplary purposes.

If, at block 508, the controller determines that the additional generated request has been received, the controller determines if there is a "previous request" in the buffer at block 514. The "previous request" may be the merged request of the one or more generated requests in the buffer. If the controller determines if there is a "previous request" in the buffer at block 514, then the controller determines if the logical address of the beginning of the additional new one or more generated requests are continuous with the logical address of the end of the "previous request" at block 516.

For example, the controller may determine if the BUFFER.START plus the BUFFER.LENGTH is equal to the NEW.START, where BUFFER.START is the beginning logical address of the request stored in the buffer, where the BUFFER.LENGTH is the length of the request stored in the buffer, and where the NEW.START is the logical address of the additional new request. When BUFFER.START+BUFFER.LENGTH=NEW.START, the logical addresses are continuous. However, when BUFFER.START+BUFFER.LENGTH NEW.START, the logical addresses are not continuous.

When the controller determines that the logical addresses are not continuous at block 516, the controller sends the previous merged request stored in the buffer to the host and pushes the additional new request to the buffer at block 524. A timeout counter is initialized at block 506 for the additional new request stored in the buffer at block 524.

However, if the controller determines that the logical addresses are continuous at block 516, then at block 518, the previous request or merged request stored in the buffer and the additional newly generated request are merged, such that the total size of the merged request is the size of the previous request or the merged request and the size of the additional newly generated request combined. After merging the requests in the buffer at block 518, a timeout counter is initialized at block 506 for the merged request with an updated total length.

If the controller determines that there is not a "previous request" in the buffer at block 514, then the controller determines if the newly generated request fills the entire buffer, such as when each buffer has a size equal to the maximum TLP size of about 256 bytes, at block 520. If the controller determines that the newly generated request does not fill an entire buffer at block 520, the newly generated request is sent to the buffer at block 522. A timeout counter is initialized at block 506 for the newly generated request stored in the buffer at block 522.

However, if the controller determines that the newly generated request fills the entire buffer at block 520, the newly generated request, in a size equal to the maximum TLP size, is sent from the buffer and the remaining data is pushed to the buffer at block 524. A timeout counter is initialized at block 506 for the remaining data stored in the buffer at block 524.

Figure 5B:
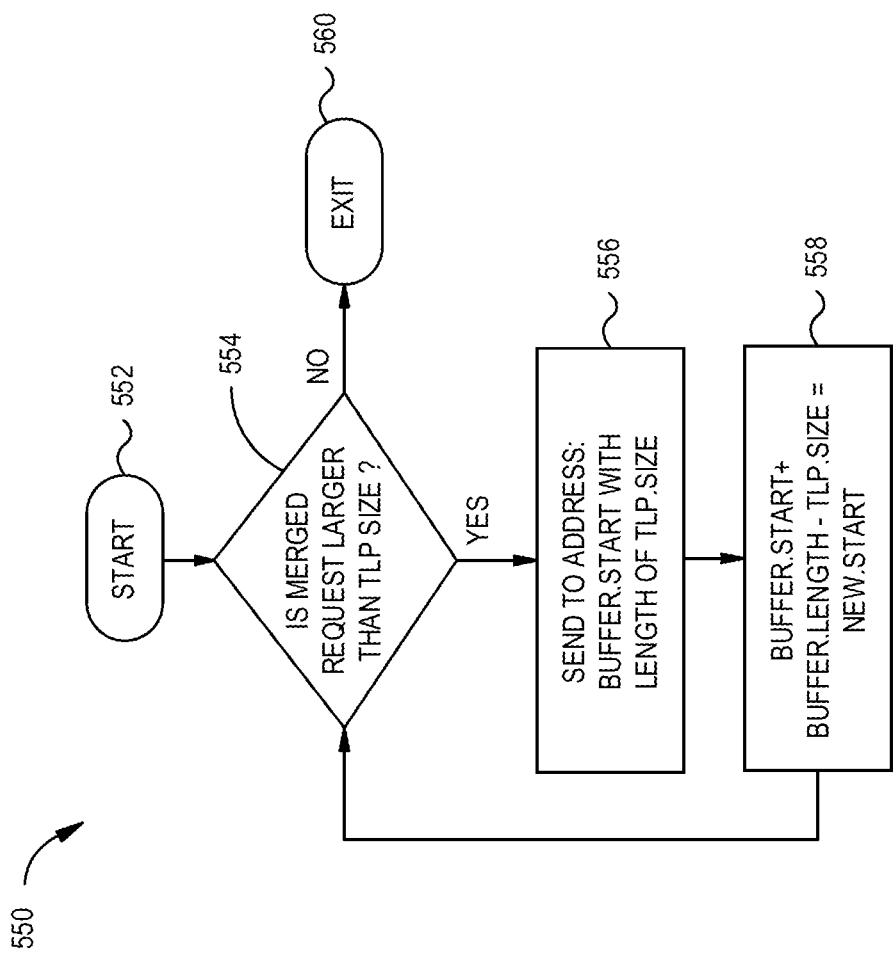
FIG. 5B is a method illustrating updating the length of the request in the buffer of FIG. 5A, according to one embodiment.

FIG. 5B is a method 550 illustrating updating the length of the merged requests in the buffer of FIG. 5A, according to one embodiment. The method 550 illustrates the updating the merged requests length at block 518 of FIG. 5A. At block 552, the previously generated request (previously newly generated requests in FIG. 5A) located in the buffer and newly generated request (previously additional newly generated request in FIG. 5A) are merged in the buffer. At block 554, the controller determines if the merged request is larger than the maximum TLP size. If the merged request is not larger than the TLP size at block 554, the method 550 exits at block 560 to the method 500, block 506, where a timeout counter is initialized for the merged request.

However, if the merged request is larger than the maximum TLP size at block 554, then the data, in the maximum TLP size, associated with the merged requests is sent to the target address, such as the host. For example, the maximum TLP size may be 256 bytes. The maximum TLP size may be referred to as the maximum payload size (MPS), such that the sent request is in the size of the MPS. The size of the request sent to the target address may be the request associated with the starting logical address, BUFFER.START, to the next logical address in a size of the maximum TLP size. For example, if the merged request has a size of about 510 bytes and the maximum TLP size is about 256 bytes, then the sent data is the first 256 bytes (i.e. bytes 1-256), where the remaining 254 bytes (i.e., bytes 257-510) remain in the buffer.

At block 558, the new starting logical address, NEW.START, of the merged request is updated, where the NEW.START is defined as BUFFER.START+BUFFER.LENGTH−TLP.SIZE=NEW.START. For example, if the BUFFER.START is 0, the BUFFER.LENGTH is about 510 bytes, the TLP. SIZE is 256, then the NEW.START is the logical address corresponding to the 257th byte (which is NEW.START=256), where the total merged data remaining has a size of about 254 bytes. After determining the new starting logical address, the method 550 returns to block 554 and repeats the process until the merged request is less than the maximum TLP size and exits the method 550 at block 560.

Figure 6:
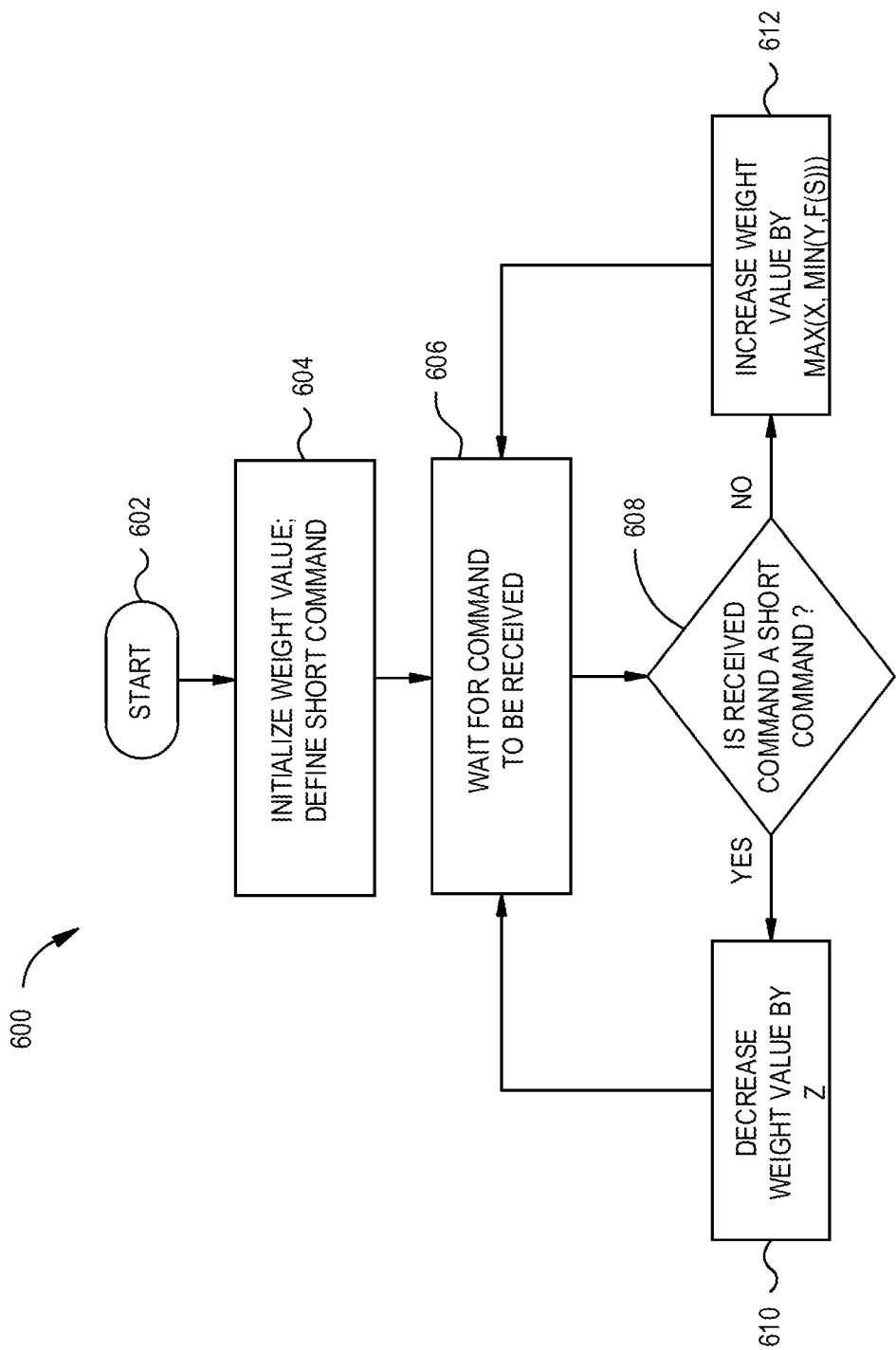
FIG. 6 is a method illustrating an update of a weight value, according to one embodiment.

FIG. 6 is a method 600 illustrating an update of a weight value, according to one embodiment. The weight value adjusts the maximum threshold value of a timeout counter, such as the timeout counter utilized by the timer 412 of FIG. 4. When the maximum threshold value of the timeout counter is decreased, requests and/or merged requests are pushed from the buffer sooner than when the maximum threshold value of the timeout counter is increased. Likewise, the when weight value is decreased, the maximum threshold value is decreased, and vice-versa. When the controller recognizes that the buffer, such as the merging buffer 410 of FIG. 4, will receive one or more newly generated requests associated with a received host command, the method 600 begins at block 602.

At block 604, a weight value is initialized to a first value of 50. The weight value may have a lower bound or threshold of about 0 and an upper bound or threshold of about 100. The previously listed values are not intended to be limiting, but to provide an example of a possible embodiment. The bounds exemplifies the minimum and maximum that the weight value may adjust to when receiving multiple requests that have continuous logical addresses. When the weight value gets closer to the lower bound, the controller may focus on the transfer latency of the commands, such as by decreasing the waiting time between transferring. When the weight value gets closer to the upper bound, the controller may focus on the transfer bandwidth of the commands, such as by increasing the waiting time such that multiple requests may be merged. Furthermore, at block 604, the controller defines the length of a short command. For example, the short command may have a maximum size value or a maximum length of about 4,096 bytes. It is to be understood that while initializing the weight value and defining the length of a short command is shown to be as one step, the initializing and the defining may be in separate steps and in any order.

At block 606, the controller waits for a command sent by the host device, such as the host computer system 170 of FIG. 1, to be received by the controller. After receiving the command at block 606, the controller determines if the received command is a short command at block 608. If the received command is a short command at block 608, then the weight value is decreased by "z" at block 610. The "z" value is a minimum value that the weight value may be decreased by such as 1. However, if the received command is not a short command at block 608, then the weight value is increased by a function of the received command size.

The result of the function can be further limited by a max and min value defined as max(x, min(y, f(s))), where f(s), for example, is the size of the command divided by the definition of "short command size". For example, if the short command size is 4,096 bytes, a command of 8,196 bytes will have an f(s) of 2. The min function can be used to increase the f(s) value and the max function can be used to decrease the f(s) value, such as when f(s) does not meet: x≥f(s)≥y. After increasing or decreasing the weight value, the method 600 returns to block 606, where the controller waits for another command to be received by the controller, where the weight value of the timer is re-calibrated.

It is to be understood that each buffer will have a corresponding timer. The timer can be re-started when new requests go into the buffer or when merged requests are pushed out of the buffer. The timer has a weighted limit that depends upon the traffic that exists. For example, if there are multiple small transactions, the traffic is called "random" while if there are fewer, longer transactions, the traffic is called "sequential". The more sequential the traffic, the more time available to wait for new requests and the possibility of merging requests. The more random the traffic, the less time available to wait for a new request.

Figure 7:
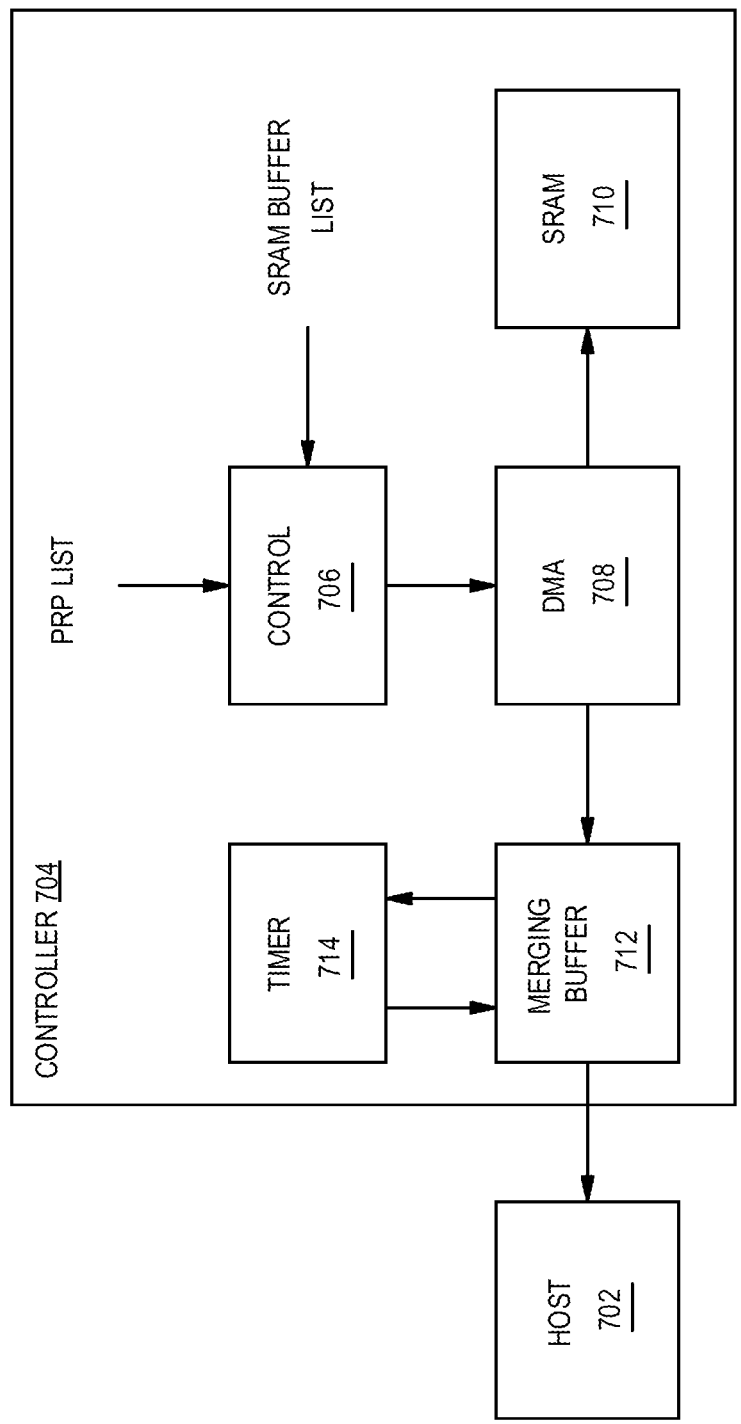
FIG. 7 is a schematic block diagram of the transfer of data to a host device, according to certain embodiments.

FIG. 7 is a schematic block diagram of the transfer of data to a host device 702, according to certain embodiments. The host device 702 is coupled to a controller 704, which may be the controller 110 of the data storage device 102 of FIG. 1. Aspects of the FIG. 7 may be similar to aspects of FIG. 4 described above. A PRP list and a SRAM buffer list is utilized by the controller 704 to determine where the data is stored or will be stored in the SRAM 710 or any other memory device of the data storage device. It is to be understood that the SRAM buffer list is utilized as an example in the current figure and the buffer list may be any appropriate internal buffer list to track the location of data stored in the data storage device. Furthermore, when receiving a command, such as a read command, from a host device 702, the DMA 708 may generate one or more requests associated with the received command. For example, a received command may be associated with 4 generated requests.

A control module 706, which may be a processor of the controller 704, activates the DMA 708 to read data associated with the one or more generated requests associated with the host command from the SRAM 710, or any other memory, and writes the relevant data back to the host 702. The DMA 708 passes the data associated with the one or more generated requests to a merging buffer 712, where the passed data is merged with any data that has a sequential logical address with the data located in the merging buffer 712.

For example, if the data in the merging buffer has a logical address of 0x0012_0000, such as the LBA #1 of the device view described in FIG. 3, and a size of about 512 bytes, a sequential logical address would be 0x0012_0200. When a LBA with a sequential logical address is received at the merging buffer 410, the previous LBA and the received LBA are merged. However, when the received LBA is not sequential to the previous LBA, then the previous LBA is written to the host and the received LBA is programmed to the merging buffer 712.

The controller 704 utilizes a timer 714 to ensure that a generated request or a merged request does not remain in the merging buffer 712 longer than a threshold time. The timer 714 may be an individual timer for the last generated request received at the merging buffer and/or a timer for the merged request. When the timer 714 reaches the threshold time, the generated request or the merged request in the merging buffer 712 is written to the host 702. The threshold time may be a timeout counter, such as when the timer 714 reaches the threshold time, the generated request or the merged request has timed out. It is contemplated that the data storage device may include more than one merging buffer, such that each of the merging buffers has a timer associated with the generated request or the merged request stored in the relevant merging buffer. As described herein, the controller 704 may utilize the merging buffer 712 for other operations, such as storing a head or a tail of a FMU, and merging a stored head or a stored tail with another FMU in order to send data to the host device 702 in an optimal size, such as in a TLP size.

Figure 8A:
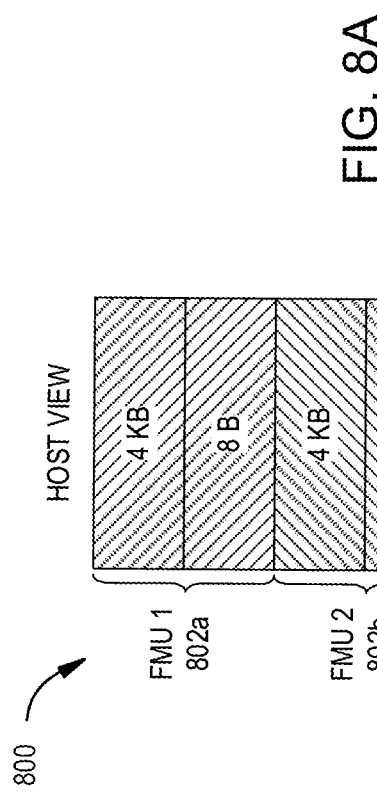
FIG. 8A is an exemplary illustration of a host view of a first FMU, a second FMU, and a third FMU, according to certain embodiments.
Figure 8B:
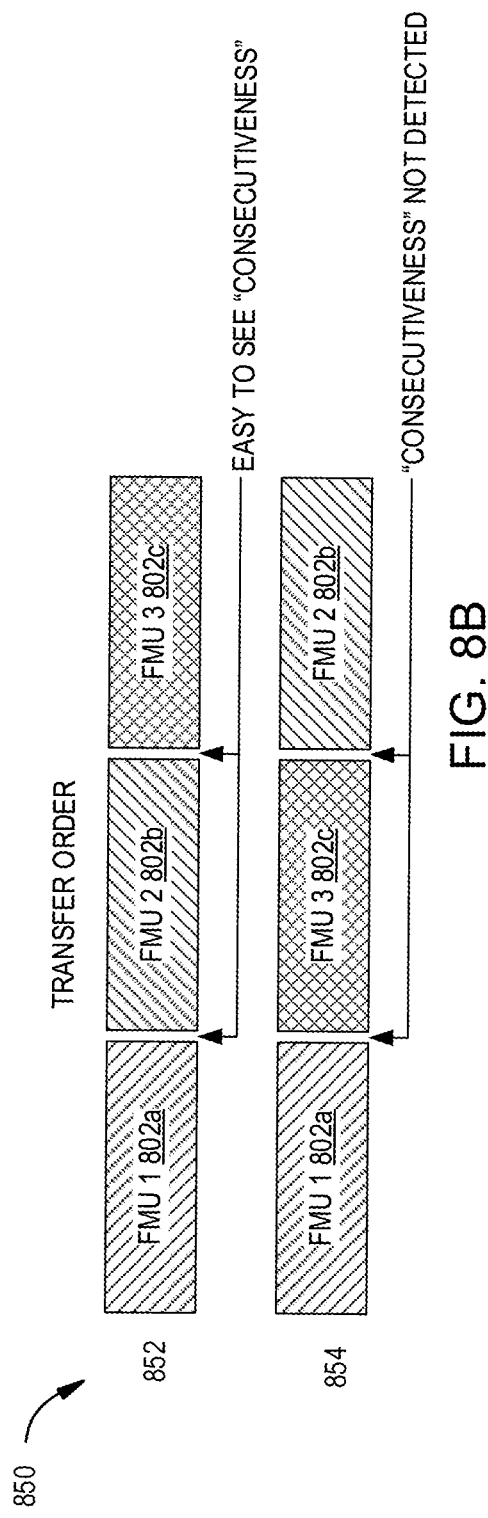
FIG. 8B is an exemplary illustration of a transfer order of the first FMU, the second FMU, and the third FMU of FIG. 8A, according to certain embodiments.

FIG. 8A is an exemplary illustration of a host view 800 of a first FMU 802a, a second FMU 802b, and a third FMU 802c, and FIG. 8B is an exemplary illustration of a transfer order 850 of the first FMU 802a, the second FMU 802b, and the third FMU 802c of FIG. 8A, according to certain embodiments. It is to be understood that the number of FMUs shown is not intended to be limiting, but to provide an example of a possible embodiment. Referring to FIG. 8A, the host view 800 shows a continuous data set (e.g., the first FMU 802a, the second FMU 802b, and the third FMU 802c). However, when sending the first FMU 802a, the second FMU 802b, and the third FMU 802c to a data storage device, such as the data storage device 102 of FIG. 1, the first FMU 802a, the second FMU 802b, and the third FMU 802c may not be transferred consecutively. Each FMU of the plurality of FMUs 802a, 802b, 802c has 4 KB of data and 8 bytes of metadata. It is to be understood that other sizes of metadata (including the metadata size of zero bytes) may be applicable to the described embodiments.

Referring to FIG. 8B, the transfer order 850 shows a first embodiment 852, where the consecutiveness of the transferred FMUs are "easy to see", and a second embodiment 854, where the consecutiveness of the transferred FMUs are "not detected". In the first embodiment 852, the first FMU 802a, the second FMU 802b, and the third FMU 802c are transferred in the same order as the order in the host view 800 of FIG. 8A. However, in the second embodiment 854, the first FMU 802a, the second FMU 802b, and the third FMU 802c are transferred in a different order than the order in the host view 800 of FIG. 8A. When skipping between different commands, which may be due to out-of-order (OOO) data transfers, or between non-consecutive FMUs in the same command, the non-consecutiveness is harder to detect.

In the first embodiment 852, the order of transmission is the first FMU 802a, then the second FMU 802b, and, lastly, the third FMU 802c. The metadata of the first FMU 802a and the data of the second FMU 802b is seen at two different TLP requests for consecutive address ranges, each arriving after the other. However, when the FMUs arrive out of order, such as in the second embodiment 854, the metadata of the first FMU 802a and the data of the second FMU 802b are not sent to adjacent TLP address ranges. Therefore, consecutiveness is harder to detect and optimization of OOO data transfers may require additional resources/processing power.

Figure 9:
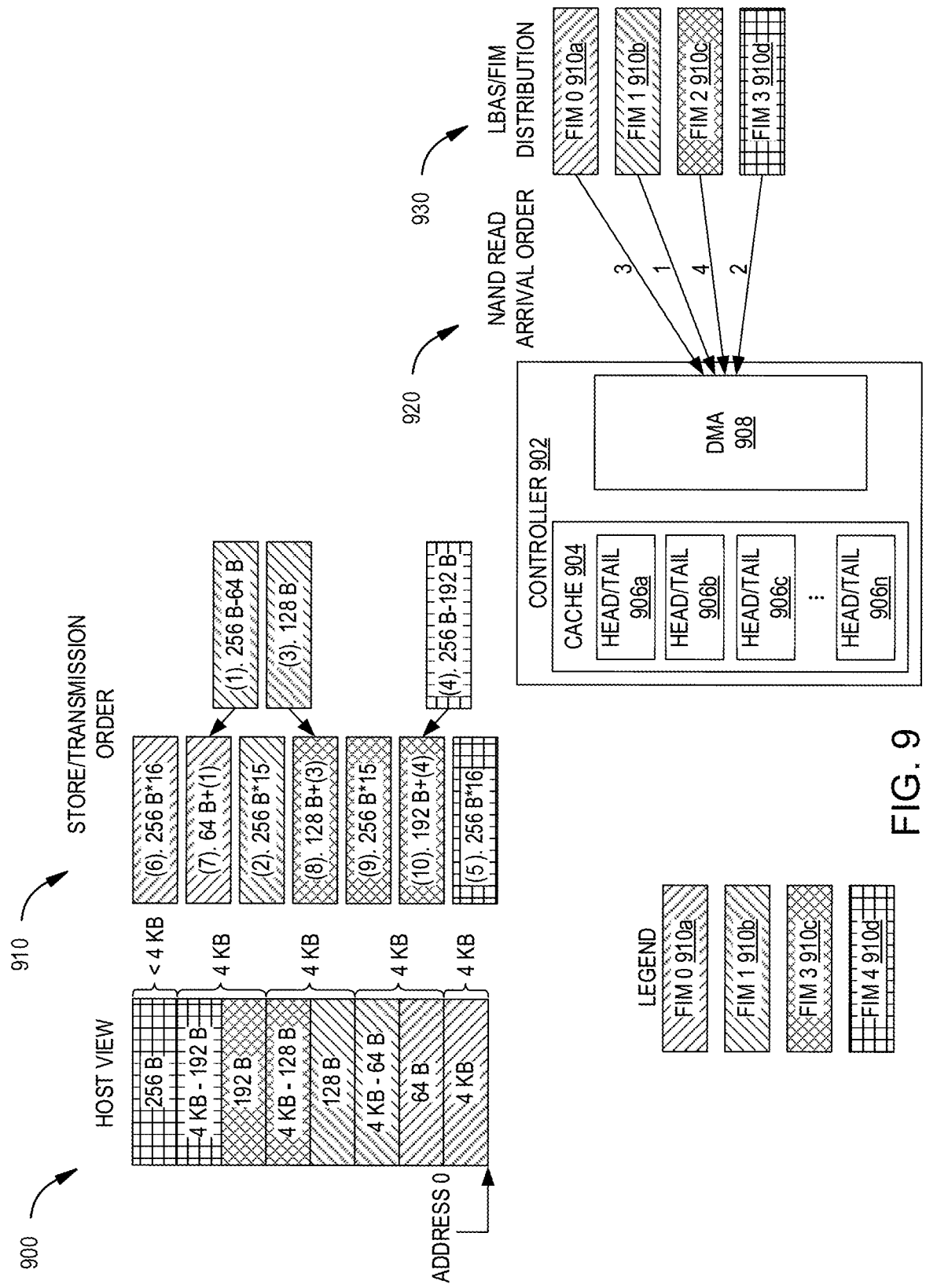
FIG. 9 is an exemplary illustration of semi-caching or fully-caching a head or a tail of a FMU, according to certain embodiments.

FIG. 9 is an exemplary illustration of buffering a head or a tail of a FMU, according to certain embodiments. FIG. 9 shows a host view 900, a store/transmission order view 910, a NAND read arrival order view 920, and a LBAs/FIM distribution view 930. Furthermore, as part of the example illustrating buffering of a head or a tail of a FMU, a controller 902 is shown. The controller 902 may be the controller 704 of FIG. 7. The controller 902 includes a cache 904 and a DMA 908. The DMA 908 may be the DMA module 144 of FIG. 1. The cache 904 includes a plurality of head/tail slots 906a-906n.

In one embodiment, the plurality of head/tail slots 906a-906n may store either a head or a tail of a FMU. In another embodiment, a first portion of slots of the plurality of head/tail slots 906a-906n may store a head of a FMU and a second portion of slots of the plurality of head/tail slots 906a-906n may store a tail of a FMU. In yet another embodiment, a first portion of slots of the plurality of head/tail slots 906a-906n may store a head of a FMU, a second portion of slots of the plurality of head/tail slots 906a-906n may store a tail of a FMU, and a third portion of slots of the plurality of head/tail slots 906a-906n may store either a head or a tail of a FMU. Furthermore, the number of slots of the plurality of head/tail slots 906a-906n may be dependent on a size of the cache 904 as well as a usage of the cache 904.

Regarding FIG. 9, a TLP size is about 256 bytes and an LBA is about 512 bytes of data and 8 bytes of metadata. An FMU size may be about 4 KB of data and 64 bytes of metadata. The previously listed values are not intended to be limiting, but to provide an example of a possible embodiment. The host view 900 shows a total of 65 aligned TLPs. The first FMU includes a 4 KB section and a 64 byte section. The second FMU includes the 4 KB-64 byte section and a 128 byte section. The third FMU includes a 4 KB-128 byte section and a 192 byte section. The fourth FMU includes a 4 KB-192 byte section and a 256 byte section. Furthermore, each FMU is allocated to a different FIM, as indicated by the different patterns. Because the transfer size is aligned to a TLP size (i.e., 256 bytes), the transfer size may be in multiples of 4 KB. Thus, portions of a FMU may be transferred with another FMU to a different FIM. For example, the 64 byte section of the first FMU may be transferred with the 4 KB-64 byte section of the second FMU.

The order that data is provided to the DMA 908 is in the order of: FIM 1 910b, FIM 3 910d, FIM 0 910a, and FIM 2 910c. In the following description, [x=#] refers to a FIM number (e.g., FIM 0 910a, FIM 1 910b, FIM 2 910c, and FIM 3 910d), where "#" may indicate the specific FIM number. Referring to the store/transmission order view 910, the following order is observed. At (1), head[x=1] is stored for 256 bytes-64 bytes due to the second FMU not being aligned with a TLP boundary. At (2), 15 TLPs of 256 bytes, each, of the second FMU are sent to the DMA 908. At (3), tail[x=1] is stored for the remaining 128 bytes. At (4), head[x=3] is stored for 256 bytes-192 bytes due to the fourth FMU not being aligned with a TLP boundary. At (5), 16 TLPs of 256 bytes, each, of the fourth FMU are sent to the DMA 908. At (6), 16 TLPs of 256 bytes, each, of the first FMU are sent to the DMA 908. At (7), a remaining 64 bytes of the first FMU is merged with head[x=1] to form a full TLP size of 256 bytes. At (8), 128 bytes of the third FMU are merged with tail[x=1] to form a full TLP size of 256 bytes. At (9), 15 TLPs of 156 bytes, each, of the third FMU are sent to the DMA 908. At (10), 192 bytes of the third FMU are merged with head[x=3] to form a full TLP size of 256 bytes.

Figure 10A:
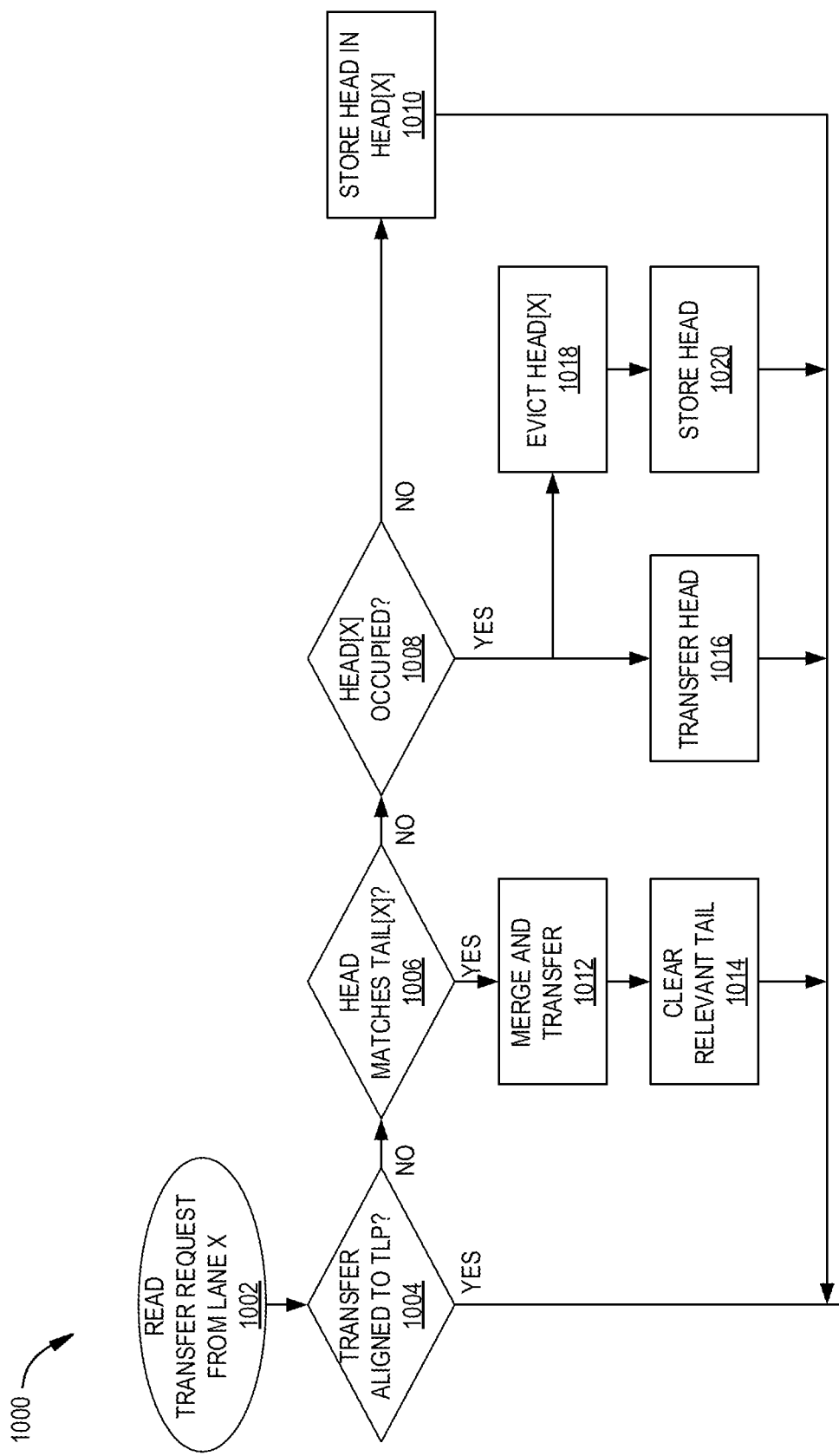
Figure 10C:
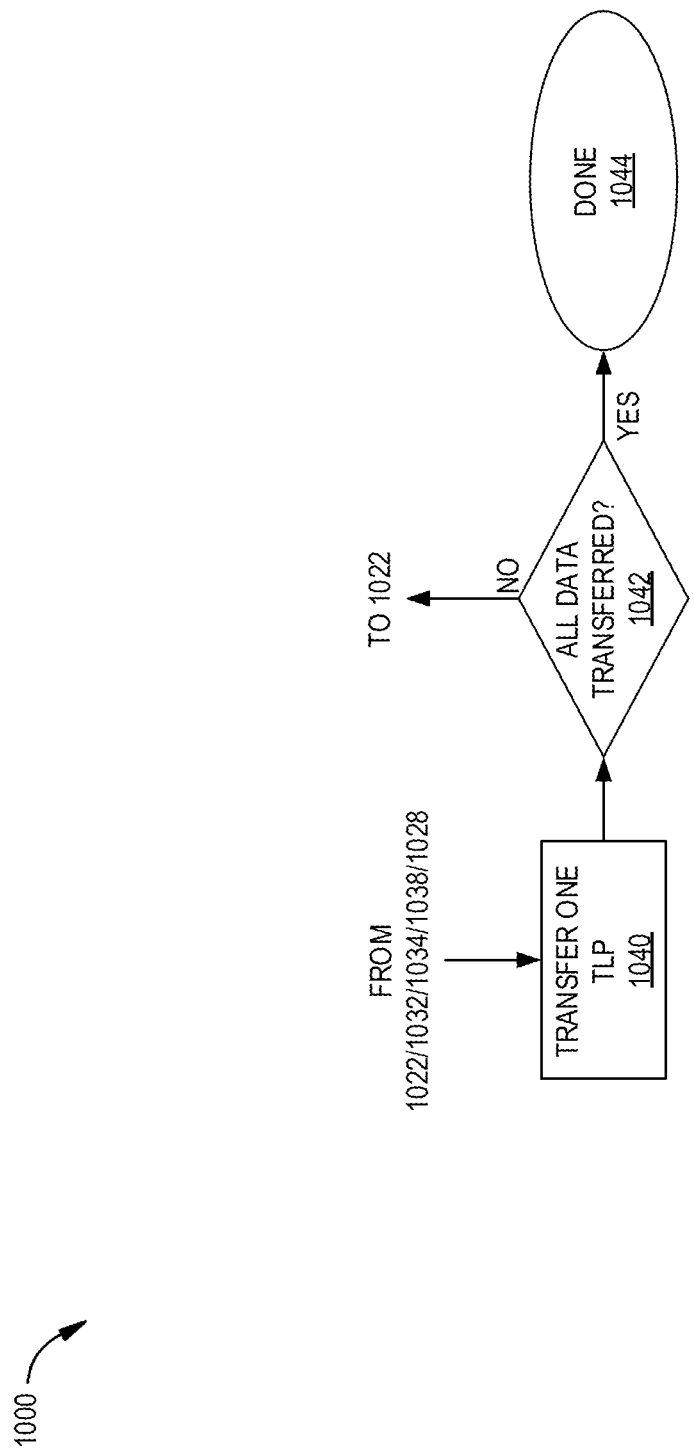

FIGS. 10A-10C are flow diagrams illustrating a method 1000 of semi-caching or fully-caching a head or a tail of a FMU, according to certain embodiments. Method 1000 may be implemented by the controller 902 using the cache 904 of FIG. 9. At block 1002, the controller 902 reads a transfer request from lane X. "X" may refer to a specific FIM, such as the first FIM 0 910a of FIG. 9. For example, slot[X] may have two different implementations. In a full-cached solution, all the slots may be used by any read requests and the algorithm used to find a free slot and or evict an occupied slot if no free slots are found may be based on the entire number of slots. In a semi-cached solution, each FIM channel may be allocated its own slot (or number of slots). Therefore, the algorithm used to find a free slot or evict an occupied slot if no free slots are found may be limited by the allocated slots to the specific FIM channel.

At block 1004, the controller 902 determines if the read transfer request is aligned to a TLP boundary. If the read transfer request is not aligned to a TLP boundary at block 1004, then the controller 902 determines if a head of the read transfer request matches a tail[X] stored in a tail slot of a cache, such as the first head/tail slot 906a of the cache 904 of FIG. 9, at block 1006.

If the head of the read transfer request matches the tail[X] stored in the tail slot of the cache 904 at block 1006, then the controller 902 merges the head with the tail stored in tail[X] and transfers the merged head/tail to a DMA, such as the DMA 908 of FIG. 9, at block 1012. It is to be understood that the term "match" or "matching" refers to a size of the head and a stored tail, where the head is of a next consecutive LBA range to the stored tail, or a tail and a stored head, where the tail is of a next consecutive LBA range to the stored head, being equal to a TLP size or a multiple of a TLP size. At block 1014, the relevant tail (i.e., tail[X]) is cleared.

However, if the head of the read transfer request does not match the tail[X] stored in the tail slot of the cache 904 at block 1006, then the controller 902 determines if a head[X] slot is occupied at block 1008. The head[X] slot may be a generic head slot or a head slot allocated for the lane (e.g., for a first FIM). If the head[X] slot is not occupied at block 1008, then the controller 902 stores the head in the head[X] slot at block 1010. However, if the head[X] slot is occupied at block 1008, then the controller 902 either transfers the head to the DMA 908 at block 1016 or evicts the head stored in head[X] to the DMA 908 at block 1018 and stores the head in the head[X] slot at block 1020.

If the transfer is aligned with to a TLP boundary at block 1004 or after blocks 1010, 1014, 1016, 1020, or 1042 (described below), then the controller 902 determines if the data left is greater than or equal to a TLP size. If the data left is not greater than or equal to a TLP size at block 1022, then the controller 902 merges the tail with the head stored in head[X] and transfers the merged head/tail to the DMA 908 at block 1030. At block 1032, the relevant head (i.e., head[X]) is cleared.

However, if the tail of the read transfer request does not match the head[X] stored in the head slot of the cache 904 at block 1024, then the controller 902 determines if a tail[X] slot is occupied at block 1026. The tail[X] slot may be a generic tail slot or a tail slot allocated for the lane (e.g., for a first FIM). If the tail[X] slot is not occupied at block 1026, then the controller 902 stores the tail in the tail[X] slot at block 1028. However, if the tail[X] slot is occupied at block 1026, then the controller 902 either transfers the tail to the DMA 908 at block 1034 or evicts the tail stored in tail[X] to the DMA 908 at block 1036 and stores the tail in the tail[X] slot at block 1038.

If the data left is equal or greater than the TLP size at block 1022 or after blocks 1028, 1032, 1034, or 1038, then the controller 902 transfers one TLP size of data associated with the read transfer request at block 1040. At block 1042, the controller 902 determines if all the data associated with the read transfer request has been transferred. If not all of the data has been transferred at block 1042, then method 1000 returns to block 1022. However, if all the data has been transferred at block 1042, then method 1000 completes at block 1044.

By storing and merging matching heads/tails of read transfer requests, optimization of out of order command processing may be improved, which may improve data storage device performance.

In one embodiment, a data storage device includes a memory device and a controller coupled to the memory device. The controller is configured to receive a command, wherein the command comprises a plurality of logical block addresses (LBAs), determine that one or more LBAs of the plurality of LBAs are not aligned to a transfer layer packet (TLP) boundary, determine whether the one or more LBAs that are not aligned to a TLP boundary has a head that is unaligned that matches a previously stored tail that is unaligned, and merge and transfer the head that is unaligned with a previously stored tail that is unaligned when the head that is unaligned matches the previously stored tail that is unaligned.

The controller is further configured to determine if a head slot is occupied when the head that is unaligned does not match the previously stored tail that is unaligned and store the head that is unaligned in the head slot when the head slot is unoccupied. The controller is further configured to either send the head that is unaligned to an interface of the controller when the head slot is occupied or transfer a stored head in the head slot to the interface when the head slot is occupied and store the head that is unaligned in the head slot after the transferring. The merging further comprises erasing the previously stored tail that is unaligned. The transferring occurs in the TLP size. The controller is further configured to determine whether the one or more LBAs that are not aligned to a TLP boundary has a tail that is unaligned that matches a previously stored head that is unaligned and merge and transfer the tail that is unaligned with a previously stored head that is unaligned when the tail is unaligned that matches the previously stored head that is unaligned. The controller is further configured to determine if a tail slot is occupied when the tail that is unaligned does not match the previously stored head that is unaligned and store the tail that is unaligned in the tail slot when the tail slot is unoccupied. The controller is further configured to either send the tail that is unaligned to an interface of the controller when the tail slot is occupied or transfer a stored tail in the tail slot to the interface when the tail slot is occupied and store the tail that is unaligned in the tail slot after the transferring. The merging further comprises erasing the previously stored head that is unaligned. The data storage device further includes a merging buffer and a timer. The merging buffer includes a plurality of head slots and a plurality of tail slots. The controller is further configured to either use all of the plurality of head slots to store unaligned heads and the plurality of tail slots to store unaligned tails or assign a portion of the plurality of head slots and a portion of the plurality of tail slots to a flash interface module (FIM) channel of two or more FIM channels.

In another embodiment, a data storage device includes a memory device and a controller coupled to the memory device. The controller is configured to receive a plurality of logical block addresses (LBAs), determine that at least one LBA of a flash interface module (FIM) is unaligned to a transfer layer packet (TLP) size, store either a head or a tail of the at least one LBA in a merging buffer, wherein the head or the tail corresponds with an unaligned portion of the at least one LBA, either merge the head with another unaligned tail stored in the merging buffer, wherein the another unaligned tail corresponds to a different LBA, or merge the tail with another unaligned head stored in the merging buffer, wherein the another unaligned head corresponds to a different LBA, and program the merged LBA to a host device.

The another unaligned tail and/or the another unaligned head is a previously merged unaligned head or a previously merged unaligned tail. The plurality of LBAs are received consecutively and processed non-consecutively. The controller is further configured to store the head in a head slot when there is not another unaligned tail stored in the merging buffer that matches the head or store the tail in a tail slot when there is not another unaligned head stored in the merging buffer that matches the tail. The controller is configured to evict the stored head and/or the stored tail when a respective time threshold is reached or exceeded. The respective time threshold is based on either a random workload, a sequential workload, or a combination of the random workload and the sequential workload. The evicting includes programming the stored head and/or the stored tail to the memory device as an unaligned LBA.

In another embodiment, a data storage device includes memory means and a controller coupled to the memory means. The controller is configured to receive one or more unaligned logical block address (LBAs), determine that a head of a received unaligned LBA is unaligned with a transfer layer packet (TLP) boundary or that a tail of the received unaligned LBA is unaligned with the TLP boundary, store the head or the tail in a merging buffer, determine if there is another tail in the merging buffer that matches the head or if there is another head in the merging buffer that matches the tail, merge the another tail and the head when the another tail matches the head or merge the another head and the tail when the another head matches tail, and program the merged another head or the merged another tail to a host device.

The controller is further configured to maintain the merging buffer in a full-cached mode or a semi-cached mode.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
    a memory device; and
    a controller coupled to the memory device, wherein the controller is configured to:
        receive a command, wherein the command comprises a plurality of logical block addresses (LBAs);
        determine that one or more LBAs of the plurality of LBAs are not aligned to a transfer layer packet (TLP) boundary;
        determine whether the one or more LBAs that are not aligned to a TLP boundary has a head that is unaligned that matches a previously stored tail that is unaligned; and
        merge and transfer the head that is unaligned with a previously stored tail that is unaligned when the head that is unaligned matches the previously stored tail that is unaligned.

2. The data storage device of claim 1, wherein the controller is further configured to:
    determine if a head slot is occupied when the head that is unaligned does not match the previously stored tail that is unaligned; and
    store the head that is unaligned in the head slot when the head slot is unoccupied.

3. The data storage device of claim 2, wherein the controller is further configured to either:
    send the head that is unaligned to an interface of the controller when the head slot is occupied; or
    transfer a stored head in the head slot to the interface when the head slot is occupied and store the head that is unaligned in the head slot after the transferring.

4. The data storage device of claim 1, wherein the merging further comprises erasing the previously stored tail that is unaligned.

5. The data storage device of claim 1, wherein the transferring occurs in the TLP size.

6. The data storage device of claim 1, wherein the controller is further configured to:
    determine whether the one or more LBAs that are not aligned to a TLP boundary has a tail that is unaligned that matches a previously stored head that is unaligned; and
    merge and transfer the tail that is unaligned with a previously stored head that is unaligned when the tail is unaligned that matches the previously stored head that is unaligned.

7. The data storage device of claim 6, wherein the controller is further configured to:
    determine if a tail slot is occupied when the tail that is unaligned does not match the previously stored head that is unaligned; and
    store the tail that is unaligned in the tail slot when the tail slot is unoccupied.

8. The data storage device of claim 7, wherein the controller is further configured to either:
    send the tail that is unaligned to an interface of the controller when the tail slot is occupied; or
    transfer a stored tail in the tail slot to the interface when the tail slot is occupied and store the tail that is unaligned in the tail slot after the transferring.

9. The data storage device of claim 6, wherein the merging further comprises erasing the previously stored head that is unaligned.

10. The data storage device of claim 1, further comprising a merging buffer and a timer.

11. The data storage device of claim 10, wherein the merging buffer includes a plurality of head slots and a plurality of tail slots.

12. The data storage device of claim 11, wherein the controller is further configured to either:
    use all of the plurality of head slots to store unaligned heads and the plurality of tail slots to store unaligned tails; or
    assign a portion of the plurality of head slots and a portion of the plurality of tail slots to a flash interface module (FIM) channel of two or more FIM channels.

13. A data storage device, comprising:
    a memory device; and
    a controller coupled to the memory device, wherein the controller is configured to:
        receive a plurality of logical block addresses (LBAs);
        determine that at least one LBA of a flash interface module (FIM) is unaligned to a transfer layer packet (TLP) size;
        store either a head or a tail of the at least one LBA in a merging buffer, wherein the head or the tail corresponds with an unaligned portion of the at least one LBA;
        either:
            merge the head with another unaligned tail stored in the merging buffer, wherein the another unaligned tail corresponds to a different LBA; or merge the tail with another unaligned head stored in the merging buffer, wherein the another unaligned head corresponds to a different LBA; and program the merged LBA to a host device.

14. The data storage device of claim 13, wherein the another unaligned tail and/or the another unaligned head is a previously merged unaligned head or a previously merged unaligned tail.

15. The data storage device of claim 13, wherein the plurality of LBAs are received consecutively and processed non-consecutively.

16. The data storage device of claim 13, wherein the controller is further configured to store the head in a head slot when there is not another unaligned tail stored in the merging buffer that matches the head or store the tail in a tail slot when there is not another unaligned head stored in the merging buffer that matches the tail.

17. The data storage device of claim 16, wherein the controller is configured to evict the stored head and/or the stored tail when a respective time threshold is reached or exceeded, wherein the respective time threshold is based on either a random workload, a sequential workload, or a combination of the random workload and the sequential workload.

18. The data storage device of claim 17, wherein the evicting comprises programming the stored head and/or the stored tail to the memory device as an unaligned LBA.

19. A data storage device, comprising:

memory means; and a controller coupled to the memory means, wherein the controller is configured to:

receive one or more unaligned logical block address (LBAs);

determine that a head of a received unaligned LBA is unaligned with a transfer layer packet (TLP) boundary or that a tail of the received unaligned LBA is unaligned with the TLP boundary;

store the head or the tail in a merging buffer;

determine if there is another tail in the merging buffer that matches the head or if there is another head in the merging buffer that matches the tail;

merge the another tail and the head when the another tail matches the head or merge the another head and the tail when the another head matches tail; and program the merged another head or the merged another tail to a host device.

20. The data storage device of claim 19, wherein the controller is further configured to maintain the merging buffer in a full-cached mode or a semi-cached mode.

* * * * *